United States Patent
Pao et al.

(10) Patent No.: US 9,329,327 B2
(45) Date of Patent: May 3, 2016

(54) DISPLAY AND FRONT-LIGHT MODULE THEREOF

(71) Applicant: E Ink Holdings Inc., Hsinchu (TW)

(72) Inventors: Yu-Nan Pao, Hsinchu (TW); I-Jeng Chen, Hsinchu (TW); Hsin-Tao Huang, Hsinchu (TW); Chin-Ju Hsu, Hsinchu (TW); Yu-Nan Tsao, Hsinchu (TW); Sheng-Chieh Tai, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 200 days.

(21) Appl. No.: 14/101,358

(22) Filed: Dec. 10, 2013

(65) Prior Publication Data

US 2014/0286045 A1 Sep. 25, 2014

(30) Foreign Application Priority Data

Mar. 22, 2013 (TW) .............................. 102110328 A

(51) Int. Cl.
*G02B 6/00* (2006.01)
*F21V 8/00* (2006.01)
*G02F 1/1335* (2006.01)

(52) U.S. Cl.
CPC .............. *G02B 6/005* (2013.01); *G02B 6/0016* (2013.01); *G02B 6/0036* (2013.01); *G02F 2001/133616* (2013.01)

(58) Field of Classification Search
CPC .... G02B 6/005; G02B 6/0016; G02B 6/0026; G02B 6/0036; G02F 1/1335; G02F 1/1333; G02F 1/133615; G02F 1/167; G02F 2001/133616
See application file for complete search history.

(56) References Cited

U.S. PATENT DOCUMENTS

| | | | |
|---|---|---|---|
| 6,603,519 B2* | 8/2003 | Fukiharu | G02F 1/133308 349/63 |
| 6,742,921 B2* | 6/2004 | Umemoto | G02B 6/0038 349/63 |
| 7,004,610 B2 | 2/2006 | Yamashita et al. | |
| 7,452,120 B2 | 11/2008 | Lee et al. | |
| 7,483,097 B2 | 1/2009 | Tsai et al. | |
| 7,513,661 B2 | 4/2009 | Hamada et al. | |
| 7,927,003 B2 | 4/2011 | Chang | |

(Continued)

FOREIGN PATENT DOCUMENTS

| | | |
|---|---|---|
| CN | 1441297 A | 9/2003 |
| CN | 1237374 C | 1/2006 |

(Continued)

OTHER PUBLICATIONS

Corresponding TW Office Action.

(Continued)

*Primary Examiner* — Julie Bannan
(74) *Attorney, Agent, or Firm* — CKC & Partners Co., Ltd.

(57) ABSTRACT

A display includes a reflective display module, a light guide plate, at least one light source and a cover lens. The light guide plate includes a first light guide surface opposite to the reflective display module. The first light guide surface includes a light outgoing region and a peripheral region surrounding the light outgoing region. The light source is used for emitting a light to the light guide plate. The peripheral region of the first light guide surface is connected to the cover lens. The light outgoing region and the cover lens are spatially separated, and define an air gap therebetween.

8 Claims, 9 Drawing Sheets

(56) References Cited

U.S. PATENT DOCUMENTS

| | | |
|---|---|---|
| 2001/0028419 A1 | 10/2001 | Fukiharu |
| 2002/0015314 A1 | 2/2002 | Umemoto et al. |
| 2003/0020850 A1* | 1/2003 | Funamoto ......... G02F 1/133553 349/65 |
| 2007/0109219 A1* | 5/2007 | Whitesides ............. G02F 1/167 345/55 |
| 2008/0278658 A1* | 11/2008 | Kim .................. G02F 1/133528 349/63 |
| 2009/0262283 A1 | 10/2009 | Olson et al. |
| 2011/0141399 A1 | 6/2011 | Kim et al. |
| 2012/0262413 A1 | 10/2012 | Huang et al. |

FOREIGN PATENT DOCUMENTS

| | | |
|---|---|---|
| CN | 1321336 C | 6/2007 |
| CN | 101598865 A | 12/2009 |
| CN | 102472456 A | 5/2012 |
| TW | 550398 B | 9/2003 |
| TW | 566569 | 12/2003 |
| TW | I240814 B | 10/2005 |
| TW | 201248081 A | 12/2012 |

OTHER PUBLICATIONS

Corresponding Chinese Office Action that these art references were cited on Nov. 20, 2015.

* cited by examiner

US 9,329,327 B2

DISPLAY AND FRONT-LIGHT MODULE THEREOF

RELATED APPLICATIONS

This application claims priority to Taiwanese Application Serial Number 102110328, filed Mar. 22, 2013, which is herein incorporated by reference.

BACKGROUND

1. Technical Field

Embodiments of the present invention relate to a display. More particularly, embodiments of the present invention relate to a reflective display and the front-light module thereof.

2. Description of Related Art

A typical electronic book reader, which is configured to show colored images employs a color filter disposed on a reflective display panel. The reflective display panel includes a plurality of microcapsules having black and white particles. The color filter includes a plurality of sub-pixel regions having various colors, such as red, green and blue. By controlling the gray scale variation of the microcapsules under different sub-pixel regions, the electronic book reader can thereby show the colored images.

To display the colored images, the sub-pixel region of the color filter absorbs the light in a particular range of wavelength, and only allows the light in the other range of wavelength to propagate therethrough. In the light propagation, the ambient light has to travel back and forth through the color filter twice. Therefore, the use efficiency of the optical energy is significantly reduced. Under this circumstance, the electronic book reader of showing colored images normally looks darker than that of showing monochrome images. In this regard, the electronic book reader requires the front-light module to improve the brightness of the shown image.

However, even though the front-light module improves the brightness of the image, the contrast ratio and the color saturation of the image need further improvements.

SUMMARY

A display is provided, in which the front-light module thereof can improve the contrast ratio and the color saturation.

In accordance with one embodiment of the present invention, a display includes a reflective display module, a light guide plate, at least one light source and a cover lens. The light guide plate includes a first light guide surface opposite to the reflective display module. The first light guide surface includes a light outgoing region and a peripheral region surrounding the light outgoing region. The light source is used for emitting a light to the light guide plate. The peripheral region of the first light guide surface is connected to the cover lens. The light outgoing region and the cover lens are spatially separated, and define an air gap therebetween.

In accordance with another embodiment of the present invention, a front-light module includes a light guide plate, at least one light source and a cover lens. The light guide plate includes a first light guide surface. The first light guide surface includes a light outgoing region and a peripheral region surrounding the light outgoing region. The light source is used for emitting a light to the light guide plate. The peripheral region of the first light guide surface is connected to the cover lens. The light outgoing region and the cover lens are spatially separated, and define an air gap therebetween.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
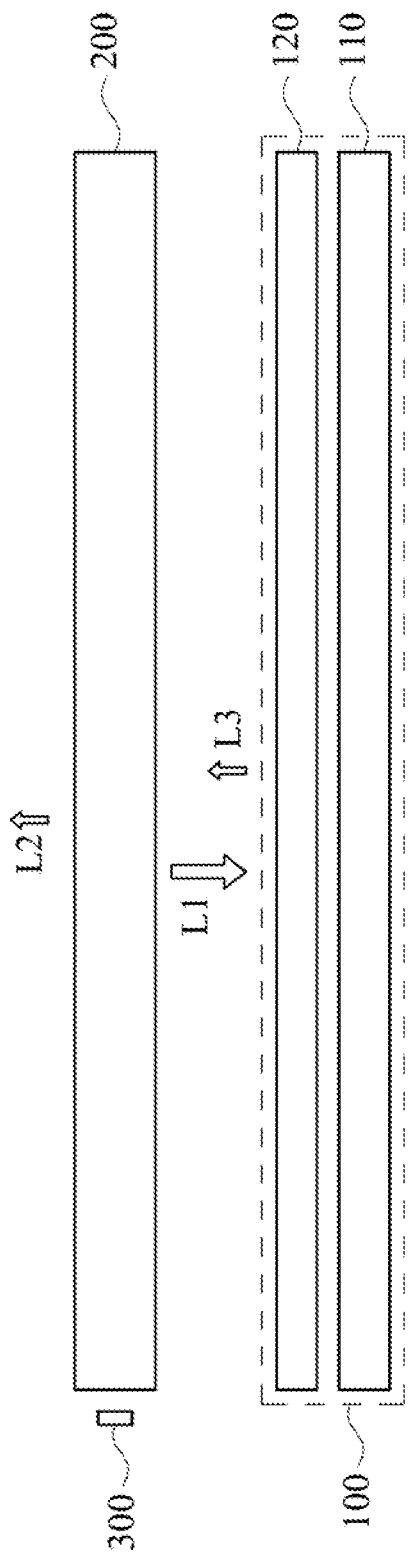
FIG. 1 is a schematic view of the optical energy transfer in the display in accordance with one embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic view of the optical energy transfer in the display in accordance with one embodiment of the present invention. As shown in FIG. 1, the display includes a reflective display module 100, a light guide plate 200 and at least one light source 300. The light source 300 is used for emitting a light to the light guide plate 200. In particular, lights emitted by the light source 300 propagate into the light guide plate 200, and these lights include a signal light L1 and a noise light L2. The light guided by the light guide plate 200 to the reflective display module 100 is the signal light L1, and the light escaping out of the light guide plate 200 along the direction opposite to the reflective display module 100 is the noise light L2. The signal light L1 has the energy S, and the noise light L2 has the energy N.

In this embodiment, the reflective display module 100 is a color reflective display module. In particular, the reflective display module 100 includes a reflective display panel 110 and a color filter 120. The color filter 120 is positioned between the reflective display panel 110 and the light guide plate 200, so as to generate the colored image. When the signal light L1 propagates from the light guide plate 200 toward the reflective display panel 110, it passes through the color filter 120, and the color filter 120 absorbs portion of the energy of the signal light L1. Therefore, when the signal light L1 is reflected by the reflective display module 100 and thereby form the reflected light. L3, the energy of the reflected light L3 only remains $S \times R_{EPD} \times \eta_{CF}$. The term "$R_{EPD}$" refers to the reflectivity, and the term "$\eta_{CF}$" refers to the energy use efficiency of the color filter 120. When an observer watches the display, only the reflected light L3 and the noise light. L2 propagate into the human eyes, and only the reflective light L3 carries the image information, and the noise light L2 does not carry any image information. Hence, the signal noise ratio (S/N ratio) is regarded as the energy ratio of the reflected light L3 to the noise light L2, namely, the S/N ratio satisfies:

$$\text{S/N ratio} = S \times R_{EPD} \times \eta_{CF}/N \qquad \text{(Equation 1)}$$

In general, the value of $R_{EPD} \times \eta_{CF}$ approximates 10%. In other words, after the signal light L1 propagates through the reflective display module 100, about 90% of the energy is lost, such that the S/N ratio is severely reduced. Further, only the reflected light L3 passing through the color filter 120 is colored, and the noise light L2 not passing through the color filter 120 is monochrome. In other words, in the lights getting into the human eyes, the ratio of the colored light energy to the monochrome light energy is also regarded as $S \times R_{EPD} \times \eta_{CF}/N$. Therefore, the color saturation is lowered due to the reduction of the S/N ratio. Hence, as long as the noise light L2 can be reduced, the color saturation of the display can be improved.

Figure 2:
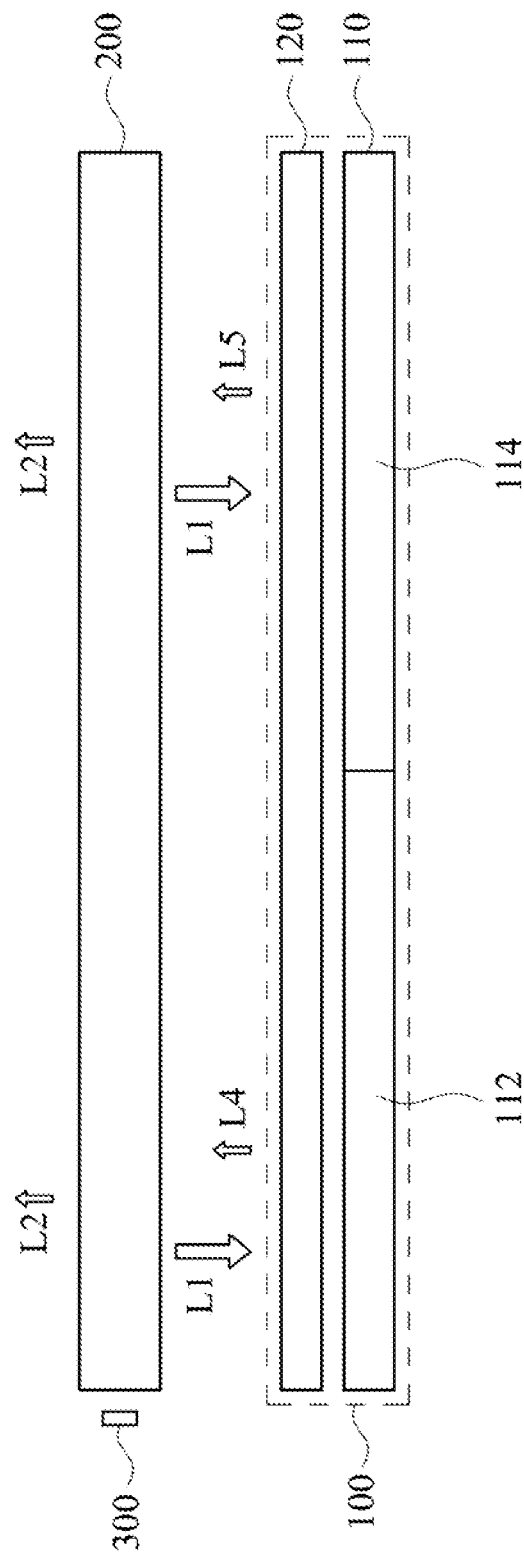
FIG. 2 is a schematic view of the optical energy transfer in the display in accordance with another embodiment of the present invention.

FIG. 2 is a schematic view of the optical energy transfer in the display in accordance with another embodiment of the present invention. As shown in FIG. 2, in this embodiment, the reflective display panel 110 includes at least one white electronic ink layer 112 and at least one black electronic ink layer 114. The white electronic ink layer 112 and the black electronic ink layer 114 are both covered by the color filter 120. The contrast ratio CR_EPD of the reflective display panel 110 is the ratio of the reflectivity of the white electronic ink layer 112 to the reflectivity of the black electronic ink layer 114. In other words, the contrast ratio CR_EPD satisfies:

$$CR\_EPD = \frac{R_w}{R_b} \qquad \text{(Equation 2)}$$

In Equation 2 the term "$R_W$" refers to the reflectivity of the white electronic ink layer 112, and the term "$R_b$" refers to the reflectivity of the black electronic ink layer 114.

The contrast ratio CR_DISPLAY of the display is the ratio of the total energy, including the energy of the reflected light L4 reflected by the white electronic ink layer 112 and the energy of the noise light L2 guided by the light guide plate 200 opposite to the reflective display module 100, to another total energy, including the energy of the reflected light L5 reflected by the black electronic ink layer 114 and the energy of the noise light L2 guided by the light guide plate 200 opposite to the reflective display module 100. In other words, the contrast ratio CR_DISPLAY satisfies:

$$CR\_DISPLAY = \frac{S\eta_{CF}R_w + N}{S\eta_{CF}R_b + N} \qquad \text{(Equation 3)}$$

According to Equation 2 and Equation 3, it is obtained that:

$$CR\_DISPLAY = \frac{S\eta_{CF}R_w + N}{S\eta_{CF}R_b + N} \langle \frac{R_w}{R_b} = CR\_EPD \qquad \text{(Equation 4)}$$

According to Equation 4, the contrast ratio CR_DISPLAY of the display is lower than the contrast ratio CR_EPD of the reflective display panel 110. Moreover, according to Equation 4, as long as the energy N of the signal light L2 gets close to zero, the contrast ratio CR_DISPLAY can be improved to be almost equal to the contrast ratio CR_EPD of the reflective display panel 110. Hence, as long as the noise light L2 is reduced, the contrast ratio CR_DISPLAY of the display can be improved.

Based on the foregoing description, how to reduce the signal light L2 is the key of improving the color saturation and the contrast ratio of the display. Hence, embodiments of the present invention provide a display capable of reducing the noise light L2.

Figure 3:
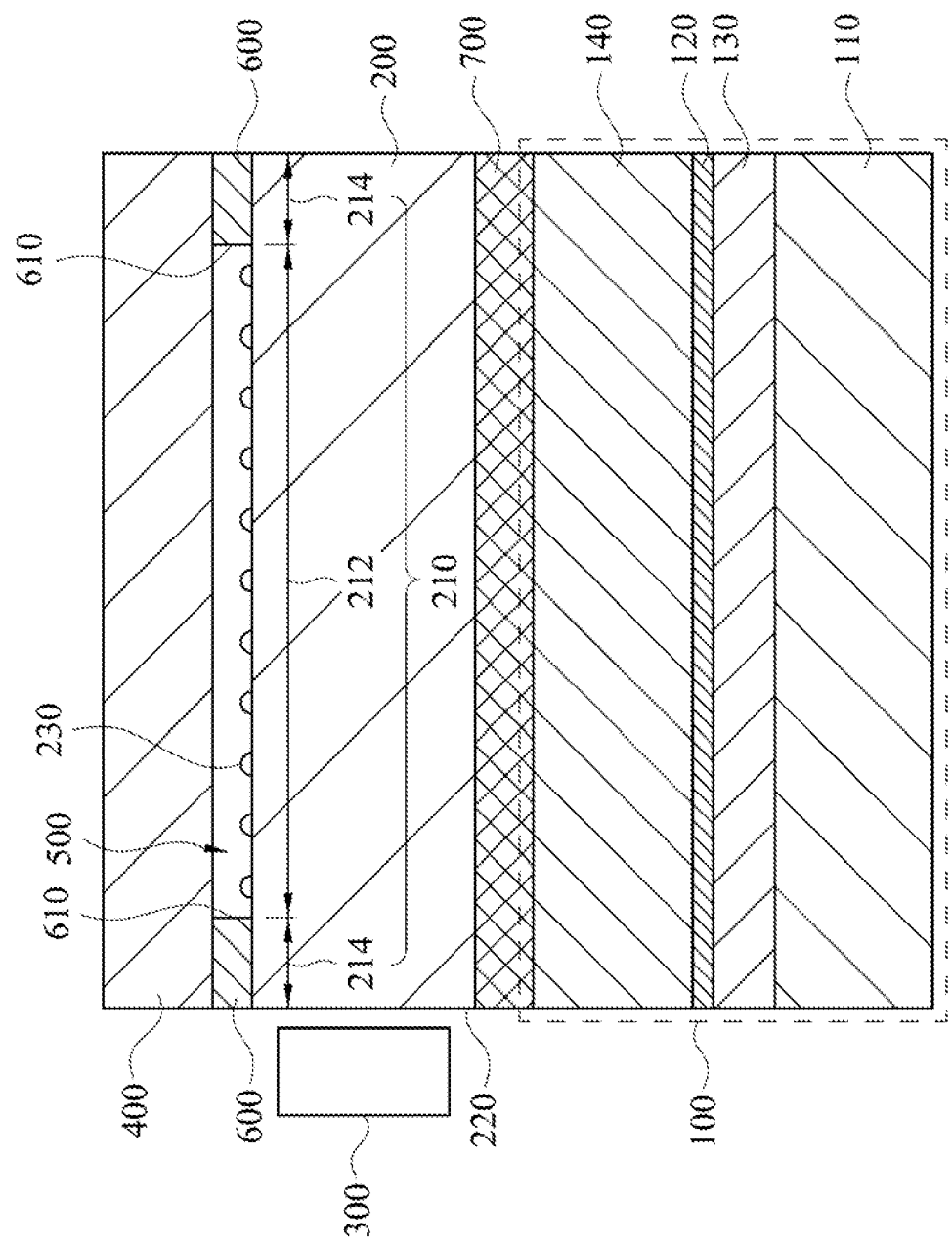
FIG. 3 is a cross-sectional view of the display in accordance with one embodiment of the present invention.

FIG. 3 is a cross-sectional view of the display in accordance with one embodiment of the present invention. As shown in FIG. 3, the display includes a front-light module and a reflective display module 100. The front-light module includes a light guide plate 200, at least one light source 300 and a cover lens 400. The light guide plate 200 includes a first light guide surface 210 opposite to the reflective display module 100. The first light guide surface 210 includes a light outgoing region 212 and a peripheral region 214 surrounding the light outgoing region 212. The light source 300 is used for emitting a light to the light guide plate 200. The peripheral region 214 of the first light guide surface 210 is connected to the cover lens 400. The light outgoing region 212 and the cover lens 400 are spatially separated, and define an air gap 500 therebetween. When the light source 300 emits lights, the light guide plate 200 guide the signal light L1 (See FIG. 1 or 2) to the reflective display module 100, and the reflective display module 100 reflects the signal light L1, and the reflected light propagates from the light outgoing region 212 to the cover lens 400.

In the foregoing embodiment, the air gap 500 is sandwiched between the light outgoing region 212 of the light guide plate 200 and the cover lens 400. In other words, the light outgoing region 212 of the light guide plate 200 and the cover lens 400 are spatially separated by the air gap 500. Preferably, the air gap 500 is a continuous chamber without intervals, and this chamber is filled with air. Because the refractive index of the air is 1, it is low in comparison to the refractive index of other medium, such as the optical glue (OCA, Optically Clear Adhesive). Therefore, the refractive index difference between the air in the air gap 500 and the material of the light guide plate 200 is greater, such that the critical angle of total internal reflection at the interface between the light guide plate 200 and the air gap 500 can be lowered, so as to prevent the light emitted by the light source 300 from escaping out of the light guide plate 200 and the cover lens 400, thereby reducing the noise light L2 (See FIGS. 1 and 2). Hence, the front-light module in the embodiment can effectively reduce the noise light, thereby improving the contrast ratio and the color saturation.

In some embodiments, the display includes an annular glue 600. The annular glue 600 is disposed between the peripheral region 214 of the first light guide surface 210 and the cover lens 400. The air gap 500 is formed inside the annular glue 600 between the cover lens 400 and the light guide plate 200. In particular, the cover lens 400 is fastened on the peripheral region 214 of the first light guide surface 210 by the annular glue 600. An inner edge 610 of the annular glue 600 is ring-shaped and is immediately adjacent to the air gap 500, so as to define the boundary of the air gap 500. In some embodiments, the inner edge 610 of the annular glue 600 is substantially aligned with the boundary between the light outgoing region 212 and the peripheral region 214. Hence, the cross-sectional area of the air gap 500 parallel to the first light guide surface 210 is substantially equal to the area of the light outgoing region 212. Preferably, the cross-sectional area of the air gap 500 parallel to the first light guide surface 210 is equal to the area of the light outgoing region 212. In other words, the air gap 500 covers the whole light outgoing region 212, and is a continuous chamber without intervals.

In some embodiments, the light guide plate 200 includes a second light guide surface 220 adjacent to the first light guide surface 210. The second light guide surface 220 faces to the light source 300 to receive the light emitted by the light source 300.

In some embodiments, the annular glue 600 can be integrally formed as one piece. In some embodiments, the annular glue 600 can be an annular structure assembled by plural bars. For example, the annular glue 600 can be, but is not limited to be, a ring-shaped structure assembled by four bar-shaped glue.

In some embodiments, the display includes a plurality of light angle control microstructures 230. The light angle control microstructures 230 are disposed on the light outgoing region 212 of the first light guide surface 210, so as to control the optical paths of the lights in the light guide plate 200. In some embodiments, the light angle control microstructures 230 and the light guide plate 200 can be formed by the same material, such as, for example, the light-transmissive material, e.g., polycarbonate (PC) or PMMA. Because the refractive index difference between the air and PC or PMMA is great, the critical angle of total internal reflection can be lowered, so as to facilitate the light angle control microstructures 230 to modify the optical paths of the lights in the light guide plate 200.

Figure 4A:
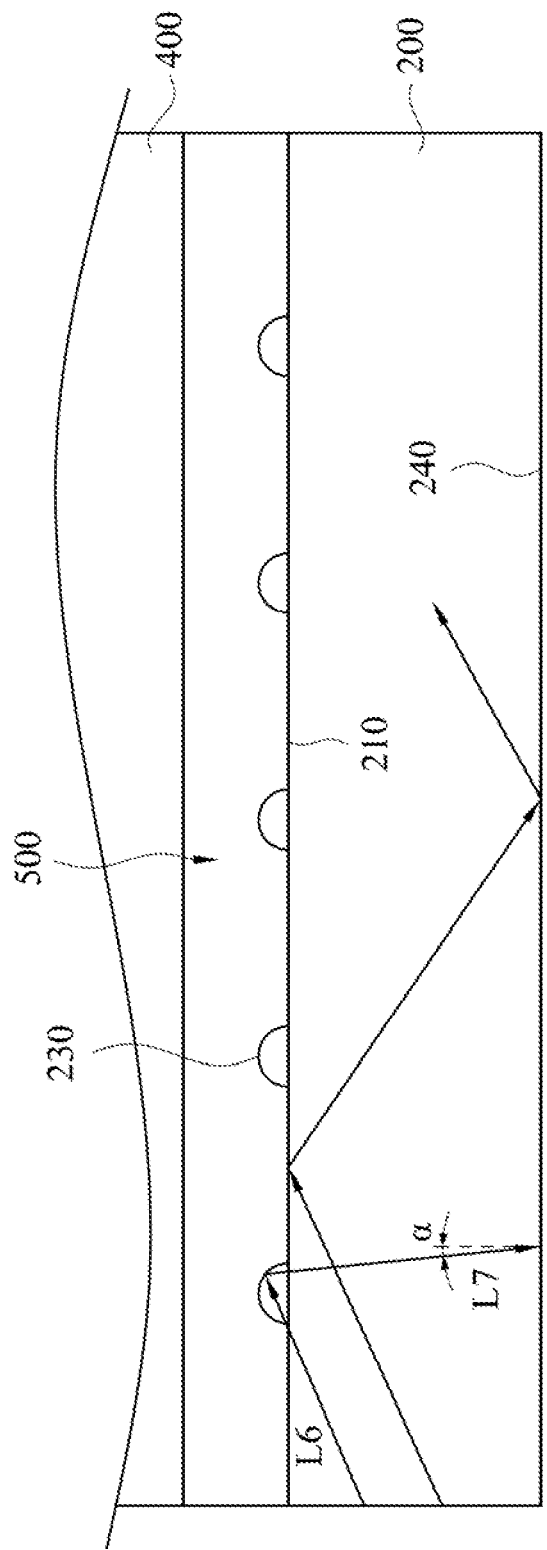
FIG. 4A is a fragmentary optical path view of the display in FIG. 3.
Figure 4B:
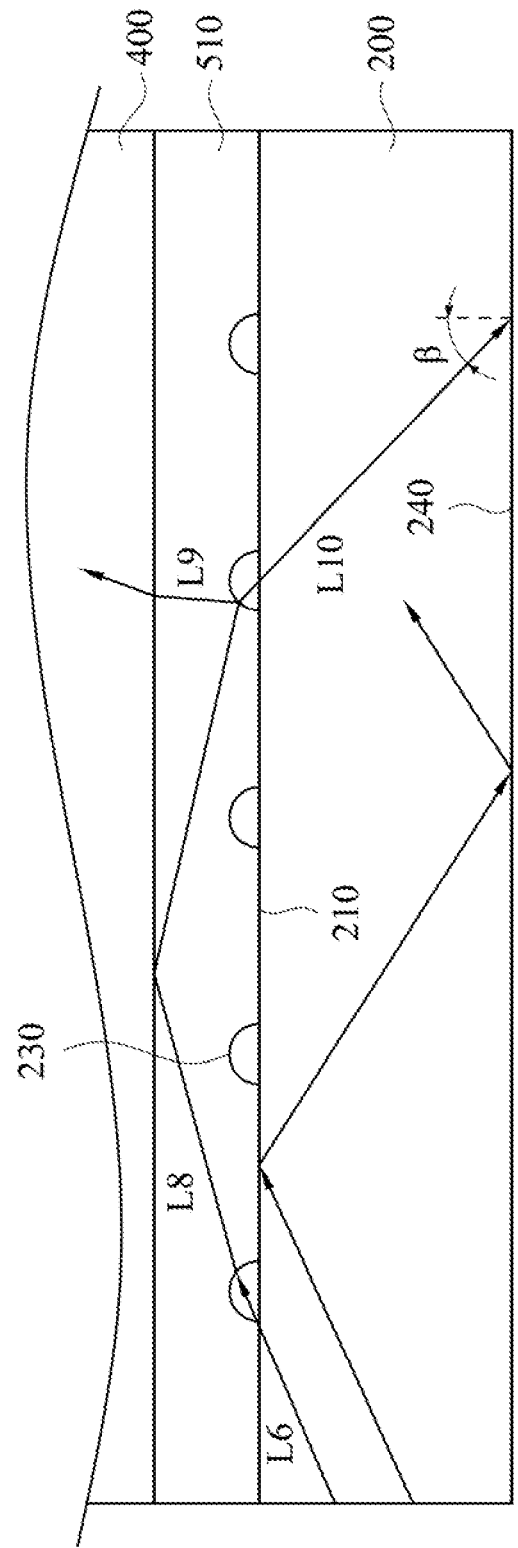
FIG. 4B is a fragmentary optical path view of the display in accordance with another embodiment of the present invention.

In particular, referring to FIGS. 4A and 4B, in which FIG. 4A is a fragmentary optical path view of the display in FIG. 3, and FIG. 4B is a fragmentary optical path view of the display in accordance with another embodiment of the present invention. As shown in FIG. 4A, the light source 300 (See FIG. 3) emits the light L6. When the light L6 arrives at the interface between the light angle control microstructure 230 and the air gap 500, total reflection occurs, thereby generating the light L7. As shown in FIG. 4B, the air gap 500 (See FIG. 4A) is replaced by an optical glue layer 510. In other words, the optical glue layer 510 is sandwiched between the light guide plate 200 and the cover lens 400. No matter what the material of the optical glue layer 510 is, the refractive index is always greater than 1. Therefore, the refractive index difference between the material of the optical glue layer 510 and the material of the light guide plate 200 is less than which between the air and the material of the light guide plate 200. Therefore, in FIG. 4B, when the light L6 with the optical path the same as shown in FIG. 4A arrives at the boundary between the light angle control microstructure 230 and the optical glue layer 510, total reflection may not occur, thereby generating the light L8 propagating into the optical glue layer 510. When the light L8 propagates in the optical glue layer 510, it can be reflected by the light angle control microstructure 230 to generate the light L9. The light L9 propagates out of the cover lens 400, thereby being the noise light.

Therefore, according to FIGS. 4A and 4B, it is clear that in comparison to the display without the air gap 500 (See FIG. 4B), the display with air gap 500 (See FIG. 4A) can further reduce the noise light, thereby improving the color saturation and the contrast ratio.

Figure 5:
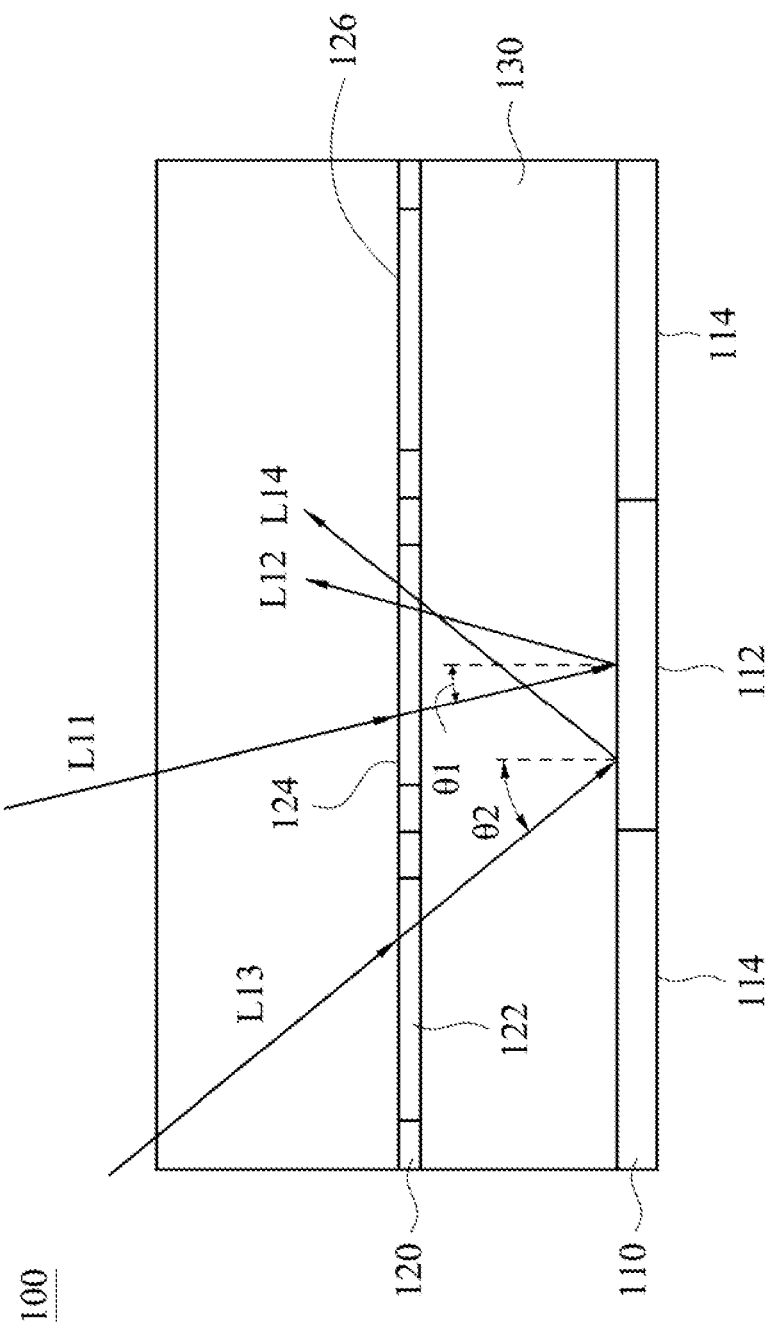
FIG. 5 is an optical path view of the reflective display module in accordance with one embodiment of the present invention.

FIG. 5 is an optical path view of the reflective display module 100 in accordance with one embodiment of the present invention. As shown in FIG. 5, a single pixel of the color filter 120 includes three sub-pixels with different colors, namely, a first sub-pixel 122, a second sub-pixel 124 and a third sub-pixel 126. For example, the color of the first sub-pixel 122 can be red, and the color of the second sub-pixel 124 can be green, and the color of the third sub-pixel 126 can be blue. It is understood that the foregoing colors are just exemplary, but are not used to limit the present invention. The light L11 and the light L13 are two lights incident into the reflective display panel 110 at different incident angles. The incident angle θ1 of the light L11 is less than the incident angle θ2 of the light L13. The light L13 is reflected by the white electronic ink layer 112 of the reflective display panel 110 to generate the light L14. The light L11 is reflected by the white electronic ink layer 112 of the reflective display panel 110 to generate the light L12. Because the incident angle θ2 of the light L13 is greater than the incident angle θ1 of the light L11, when the light L13 propagates through the first sub-pixel 122, the reflected light L14 may propagate through the second sub-pixel 124. In such situation, the incident light and the reflected light propagate through different sub-pixel, so the pure color, such as pure red or pure green, may not be shown. In contrast, because the lights L11 and L12 both propagate through the second sub-pixel 124, but not propagate through sub-pixels with different colors, the pure color, such as pure green, may be shown. Hence, the purer color may easily be shown when the incident angle that the light propagates into the reflective display module 100 is lower, thereby facilitating the display to show a preferred colored image.

As shown in FIG. 4A, when the display includes the air gap 500, after the light L6 is totally reflected by the light angle control microstructure 230 to generate the light L7, the light L7 propagates through a third light guide surface 240 of the light guide plate 200 and gets into the reflective display module 100 (See FIG. 3). By the design of the microstructure, the incident angle α that the light L7 meets the third light guide surface 240 is low. As shown in FIG. 4B, when the display does not include the air gap 500, total reflection does not occur, and the light L6 generates the light L8 that propagates into the optical glue layer 510. When the light L8 is redirected into the light guide plate 200, the light L10 is generated. The incident angle that the light L10 meets the third light guide surface 240 is referred to β. According to FIGS. 4A and 4B, it is clear that the incident angle α is less than the incident angle β. In other words, in the display having the air gap 500, the light propagates into the reflective display module 100 (See FIG. 3) at a relative less incident angle α. Therefore, in comparison to the display without the air gap 500 (See FIG. 4B), the display with air gap 500 shows images with preferred colors.

Reference is now made to FIG. 3. In some embodiments, the display includes a first adhesive layer 700. The first adhesive layer 700 is disposed between the light guide plate 200 and the reflective display module 100, so as to fasten the light guide plate 200 on the reflective display module 100. In some embodiments, the material of the first adhesive layer 700 can be, but is not limited to be, an optically clear adhesive (OCA), which is light-transmissive so that the light can propagate through.

In some embodiments, the display includes a second adhesive layer 130. The second adhesive layer 130 is disposed between the reflective display panel 110 and the color filter 120, so as to fasten the color filter 120 on the reflective display panel 110. In some embodiments, the material of the second adhesive layer 130 can be, but is not limited to be, an optically clear resin (OCR), which is light-transmissive so that the light can propagate through. As shown in FIG. 5, the OCR can be liquid during the process for manufacturing the display, so that the sub-pixel of the color filter 120, such as the first sub-pixel 122, the second sub-pixel 124 or the third sub-pixel 126, can be aligned with the white electronic ink layer 112 or the black electronic ink layer 114 of the reflective display panel 110. After aligning, the OCR can be exposed to a light, such as the ultraviolet, so as to be cured.

In some embodiments, as shown in FIG. 3, the display includes a glass 140. The glass 140 is disposed between the first adhesive layer 700 and the color filter 120. In other words, the light guide plate 200 can be fastened on the glass 140 by the first adhesive layer 700.

Figure 6B:
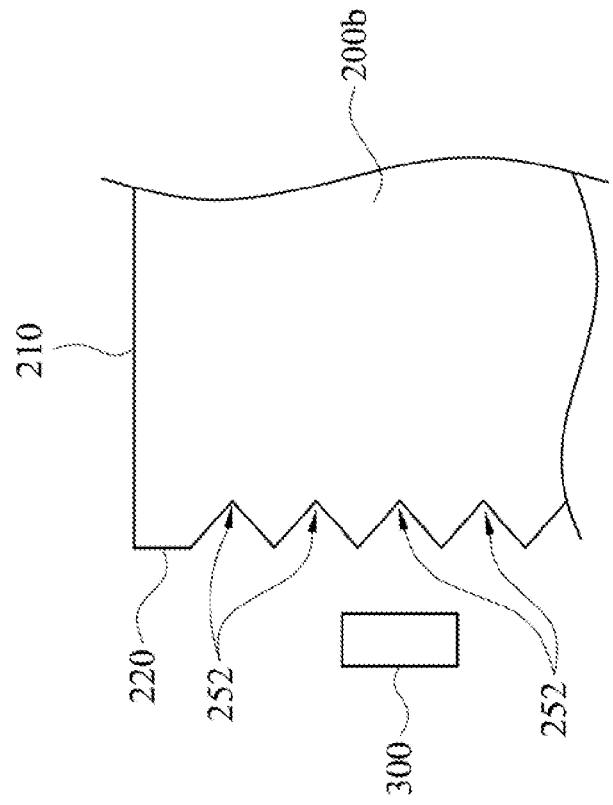
FIG. 6B is a fragmentary top view of the light guide plate in accordance with another embodiment of the present invention.
Figure 6A:
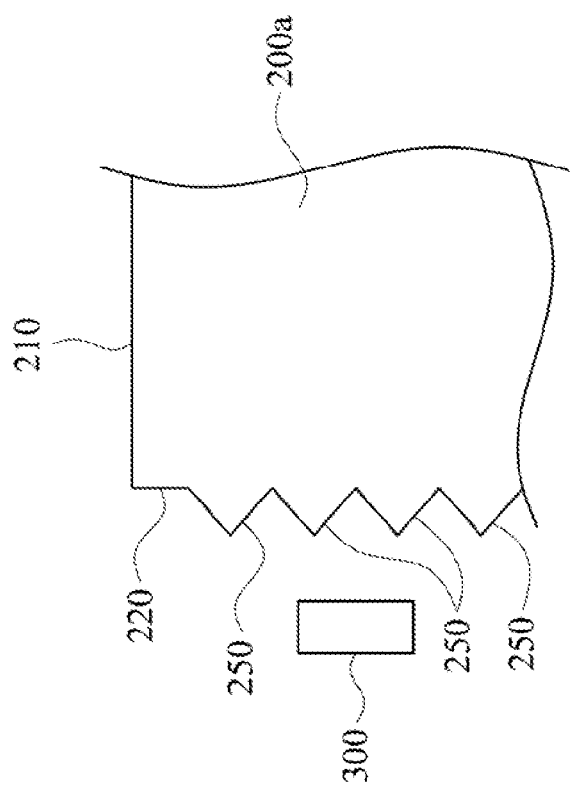
FIG. 6A is a fragmentary top view of the light guide plate in accordance with another embodiment of the present invention.

FIG. 6A is a fragmentary top view of the light guide plate 200a in accordance with another embodiment of the present invention. As shown in FIG. 6A, in some embodiments, the display includes a plurality of light diffusing microstructures 250. The light diffusing microstructures 250 are disposed on the second light guide surface 220 of the light guide plate 200a. The light source 300 is disposed above the second light guide surface 220. Hence, the lights emitted by the light source 300 toward the second light guide surface 220 can be diffused by the light diffusing microstructures 250, such that the lights can be uniformly diffused in the light guide plate 200a. As shown in FIG. 6A, the light diffusing microstructures 250 are protrusions protruded on the second light guide surface 220. In some embodiments, the light source 300 can be, but is not limited to be, an LED.

FIG. 6B is a fragmentary top view of the light guide plate 200b in accordance with another embodiment of the present invention. The main difference between this embodiment and FIG. 6A is that: the light diffusing microstructures 252 are grooves concaved on the second light guide surface 220 of the light guide plate 200b, not the protrusions protruded on the second light guide surface 220 (See FIG. 6A).

It is understood that the shapes of the light diffusing microstructures 250 and 252 are just exemplary, but are not used to limit the present invention. As long as the lights can be diffused, microstructures with other shapes can also be employed.

Figure 7:
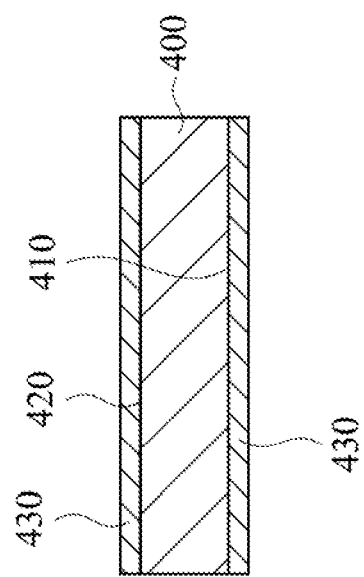
FIG. 7 is a cross-sectional view of the cover lens in accordance with another embodiment of the present invention.

FIG. 7 is a cross-sectional view of the cover lens 400 in accordance with another embodiment of the present invention. As shown in FIG. 7, in some embodiments, the cover lens 400 includes a first lens surface 410 proximal to the air gap 500 (See FIG. 3) and a second lens surface 420 distal to the air gap 500. The display includes an anti-reflection film 430. The anti-reflection film 430 can be disposed on the first lens surface 410 and the second lens surface 420. In other embodiments, the anti-reflection film 430 can be only disposed on the first lens surface 410 or the second lens surface 420. When more lights from the reflective display module 100 (See FIG. 3) are reflected by the cover lens 400, more reflected lights propagates through the sub-pixels with different colors, such that the color cannot be pure. However, because the anti-reflection film 430 reduces the reflection of the light from the reflective display module 100 occurring at the cover lens 400, the color can be purer. Moreover, the anti-reflection film 430 can also reduce the reflection of the ambient light occurring at the cover lens 400, so as to prevent the reflected light generated by the ambient light from being another noise light.

Figure 8:
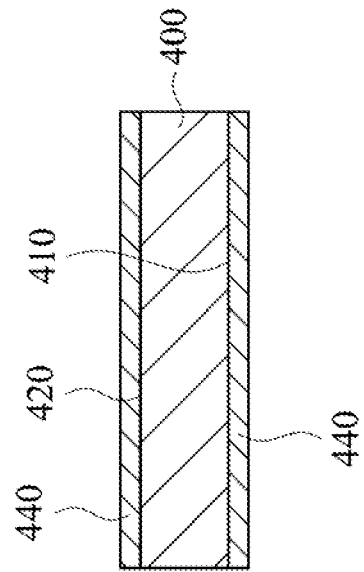
FIG. 8 is a cross-sectional view of the cover lens in accordance with another embodiment of the present invention.

FIG. 8 is a cross-sectional view of the cover lens 400 in accordance with another embodiment of the present invention. As shown in FIG. 8, the display includes an anti-ultraviolet film 440. The anti-ultraviolet film 440 can be disposed on the first lens surface 410 or the second lens surface 420. In some embodiments, the anti-ultraviolet material can be added in a material of the cover lens 400 to replace the anti-ultraviolet film 440. The anti-ultraviolet film 440 or the anti-ultraviolet material can absorb or reflect the ultraviolet light, so as to protect the display from the ultraviolet light.

Figure 9:
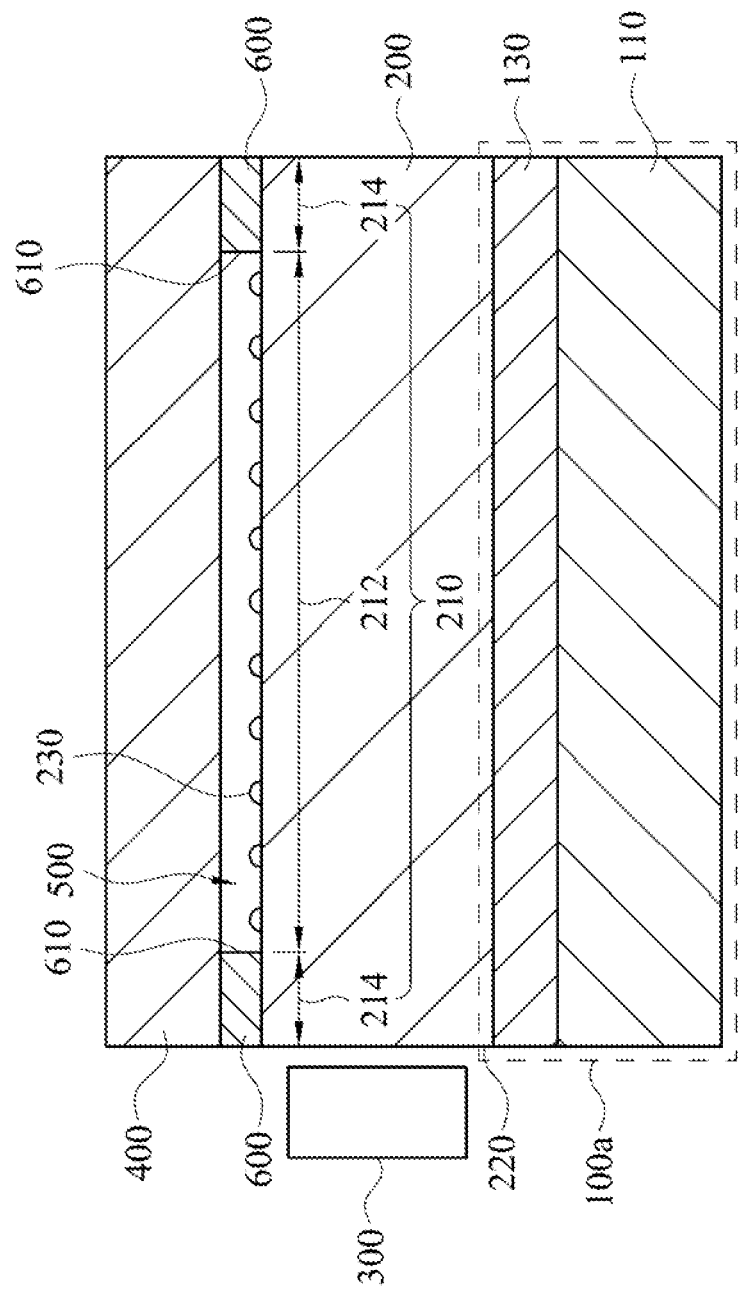
FIG. 9 is a display in accordance with another embodiment of the present invention.

FIG. 9 is a display in accordance with another embodiment of the present invention. The main difference between this embodiment and FIG. 3 is that: the reflective display module 100a is a gray-scale reflective display module. In other words, the reflective display module 100a does not include the color filter 120 shown in FIG. 3. Other elements and the correlations between the elements are the same as shown in FIG. 3 and the foregoing related description, and are not described repeatedly.

EXAMPLE

The following example is used to show the benefit that the air gap 500 in the foregoing embodiments brings. The following Chart 1 exhibits the optical parameters of a color reflective display module employed by the example.

CHART 1

|  | Reflectivity | Color saturation | Contrast ratio |
| --- | --- | --- | --- |
| Reflective display module | 10.13% | 13.05% | 12.86 |

The following Chart 2 exhibits the displaying effects of the display including the reflective display module accompanying with the front-light module without the air gap.

CHART 2

|  | X value of CIE1931 | Y value of CIE1931 | L | Color saturation/ Contrast ratio |
| --- | --- | --- | --- | --- |
| Red | 0.3839 | 0.3243 | 18.90 | 4.11% |
| Green | 0.3266 | 0.3953 | 26.44 | (Color saturation) |
| Blue | 0.2585 | 0.2528 | 14.53 |  |
| White | 0.3372 | 0.3422 | 51.99 | 7.49 |
| Black | 0.2931 | 0.2939 | 6.94 | (Contrast ratio) |

The following Chart 3 exhibits the displaying effects of the display including the reflective display module accompanying with the front-light module with the air gap.

CHART 3

|  | X value of CIE1931 | Y value of CIE1931 | L | Color saturation/ Contrast ratio |
| --- | --- | --- | --- | --- |
| Red | 0.4223 | 0.3345 | 24.64 | 9.00% |
| Green | 0.3325 | 0.4381 | 40.31 | (Color saturation) |
| Blue | 0.2419 | 0.2254 | 17.15 |  |
| White | 0.3404 | 0.3482 | 79.08 | 12.26 |
| Black | 0.3060 | 0.3079 | 6.45 | (Contrast ratio) |

According to Chart 2 and Chart 3, it is clear that the contrast ratio and the color saturation of the display with the air gap (See Chart 3) are superior to which of the display without the air gap (See Chart 2). Therefore, the air gap improves the contrast ratio and the color saturation of the display.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display, comprising:
a reflective display module, comprising a reflective display panel, an adhesive layer and a color filter, wherein the adhesive layer is disposed between the reflective display panel and the color filter;
a light guide plate comprising a first light guide surface opposite to the reflective display module, the first light guide surface comprising a light outgoing region and a peripheral region surrounding the light outgoing region, wherein the color filter is positioned between the reflective display panel and the light guide plate;
at least one light source for emitting a light to the light guide plate; and
a cover lens,
wherein the peripheral region of the first light guide surface is connected to the cover lens, and the light outgoing region and the cover lens are spatially separated and define an air gap therebetween.

2. The display of claim 1, further comprising:
an annular glue disposed between the peripheral region of the first light guide surface and the cover lens, wherein an inner edge of the annular glue is immediately adjacent to the air gap.

3. The display of claim 1, further comprising:
a plurality of light angle control microstructures disposed on the light outgoing region of the first light guide surface.

4. The display of claim 1, further comprising:
a plurality of light diffusing microstructures, wherein the light guide plate comprises a second light guide surface adjacent to the first light guide surface, wherein the light diffusing microstructures are disposed on the second light guide surface, wherein the light source is disposed above the second light guide surface.

5. The display of claim 1, further comprising:
an adhesive structure disposed between the light guide plate and the reflective display module.

6. The display of claim 1, further comprising:
an anti-reflection film, wherein the cover lens comprises a first lens surface proximal to the air gap and a second lens surface distal to the air gap, wherein the anti-reflection film is disposed on the first lens surface or the second lens surface, or both.

7. The display of claim 1, further comprising:
an anti-ultraviolet film, wherein the cover lens comprises a first lens surface proximal to the air gap and a second lens surface distal to the air gap, wherein the anti-ultraviolet film is disposed on the first lens surface or the second lens surface, or both.

8. The display of claim 1, further comprising:
an anti-ultraviolet material added in a material of the cover lens.

* * * * *